United States Patent [19]
Scheufler et al.

[11] Patent Number: 5,921,002
[45] Date of Patent: Jul. 13, 1999

[54] RADIATION CURING SYSTEM

[75] Inventors: Fred G. Scheufler, Schenectady;
Richard D. Scheufler, East Greenbush;
William H. Bayard, South Glens Falls;
Nimalakirthi Rajasinghe,
Mechanicville, all of N.Y.

[73] Assignee: Optimum Air Corporation, Malta, N.Y.

[21] Appl. No.: 08/881,851

[22] Filed: Jun. 24, 1997

Related U.S. Application Data

[63] ntinuation-in-part of application No. 08/782,427, Jan. 15, 1997., abandoned, and a continuation-in-part of application No. 08/625,068, Mar. 3, 1996., Pat. No. 5,709,038, which is a continuation-in-part of application No. 08/423,683, Apr. 18, 1995., Pat. No. 5,554,416, which is a continuation of application No. 08/126,547, Sep. 24, 1993., abandoned

[51] Int. Cl.⁶ ..................................................... F26B 3/00
[52] U.S. Cl. .................................. 34/269; 34/277; 34/571
[58] Field of Search ........................... 34/268, 269, 277,
34/428, 474–477, 481–485, 487, 497, 549,
550, 562, 571, 629, 633; 427/372.2, 378,
379, 421, 541; 118/61

[56] References Cited

U.S. PATENT DOCUMENTS

| 3,829,982 | 8/1974 | Pray et al. ................................ 34/277 |
| 3,967,385 | 7/1976 | Culbertson ................................ 34/277 |
| 3,994,073 | 11/1976 | Lackore ................................ 34/277 |
| 4,146,974 | 4/1979 | Pray ................................ 34/571 |
| 4,173,924 | 11/1979 | Bradshaw . |
| 4,291,472 | 9/1981 | Lewis . |
| 4,872,270 | 10/1989 | Fronheiser et al. . |
| 5,554,416 | 9/1996 | Scheufler et al. . |

FOREIGN PATENT DOCUMENTS

| 1264995 | 1/1990 | Canada . |
| 2097186 | 6/1992 | Canada . |
| 06007635 | 1/1994 | Japan . |
| WO 9508745 | 3/1995 | WIPO . |
| WO9630127 | 10/1996 | WIPO . |

OTHER PUBLICATIONS

"Wirtschaftlich und umweltfreundlich trocknen", Hellmann–Apparatus brochure; Apr. 1998 (one page with two–page English translation).

Energy Transfer/Conversion; Analyze the Drying Aqueous Coatings; John D. Cary and Edgar B. Gutoff–Polaroid Corp.; pp. 73–79; Reprinted from Chemical Engineering Progress; Feb. 1991.

*Primary Examiner*—Henry A. Bennett
*Assistant Examiner*—Steve Gravini
*Attorney, Agent, or Firm*—Schmeiser, Olsen & Watts

[57] ABSTRACT

An apparatus and method for rapidly drying and curing a waterborne coating as applied by a spray gun, or other means, to a product traveling on a moving continuous conveyor track. The conveyor track passes through a drying section which uses recycled filtered air to dry the coating and then into a curing section which uses an irradiator and airflow to rapidly cure the coating. The irradiator is cooled using an air flow and a damper assembly system.

10 Claims, 10 Drawing Sheets

RADIATION CURING SYSTEM

CROSS-REFERENCE TO RELATED APPLICATIONS

This application is a continuation-in-part of U.S. patent application Ser. No. 08/782,427 now abandoned, filed Jan. 15, 1997, and a continuation-in-part of U.S. patent application Ser. No. 08/625,068 filed Mar. 3, 1996 now U.S. Pat. No. 5,709,038; which is a Continuation-In-Part of U.S. patent application Ser. No. 08/423,683 filed Apr. 18, 1995, now U.S. Pat. No. 5,554,416; which is a Continuation of U.S. patent application Ser. No. 08/126,547 filed Sep. 24, 1993, now abandoned, which are all hereby incorporated by reference.

BACKGROUND OF THE INVENTION

1. Field of the Invention

This invention relates generally to curing technology, in particular, this invention is a system and method for curing waterbased coatings.

2. Description of Related Art

An air atomizing spray gun is typically utilized to rapidly apply paints, industrial coatings and other finishing products to a wide variety of industrial, commercial, and consumer goods. Unfortunately, a profusion of transient, airborne particles and associated fumes, generally designated as overspray, are produced during the application process. To reduce the potentially serious health risks associated with the inhalation and bodily contact of the overspray, spray booths and other collection systems have been designed in accordance with a plethora of strict regulations. These regulations are set forth by the Occupational Safety and Health Administration (OSHA), the Environmental Protection Agency (EPA), the National Fire Protection Association (NFPA) and a myriad of other governmental regulatory agencies, to collect and effectively treat the discharged air and direct it away from the operators of the spray equipment and other adjacent ancillary personnel. Heretofore, high volume blowers have typically been utilized to draw uncontaminated, ambient air through the coating area, where the air mixes with the overspray, and to duct the air, now contaminated with coating particles and noxious gases, into a treatment area prior to discharge.

A dry filtration system, utilizing arrestor pads, has commonly been employed to remove overspray from the contaminated air stream. As the contaminated air stream passes through an arrestor pad, the larger coating particles impact against the surface of the pad and adhere thereto.

Solvent based coatings have commonly been utilized in finishing processes due to the fast drying characteristics of the solvents. As the solvents evaporate, the coating solids suspended therein flow together and form a continuous layer of dry solids. A major disadvantage of solvent based coatings is the explosion hazard created by the inherent flammability of the solvent and the associated solvent fumes which are released during the evaporation process. Additionally, the solvent fumes discharged to the atmosphere pose an environmental hazard due to the interaction of solvents with the ozone layer. Furthermore, solvent based coatings have the disadvantages of toxicity, intense odor, volatility, skin irritancy, carcinogenicity, high film shrinkage, loss of adhesion, variable cure speeds, and change in overall film properties upon application. As such, alternative coating processes utilizing dry powders, high solids and waterborne solids have been developed to avoid the disadvantages associated with solvent based coatings.

In a dry powder coating process, an electrostatic spray gun assembly having a positive polarity is utilized to apply dry powder solids to a product having a negative polarity. Due to the resultant mutual attraction of the positively charged paint particles and the negatively charged product, overspray is substantially reduced. After receiving the dry paint particles, the coated product is baked at a high temperature until the dry paint particles melt and flow about the product, thereby forming a continuous coating. Such systems require substantial investment for equipment and have limited use due in part to the required baking step.

High solids coating systems utilize a high viscosity paint emulsion having a high solids to solvent ratio. As a result, the paint emulsion is generally applied to a product with a high pressure spray nozzle which inherently produces a substantial amount of overspray. The coated product is subsequently cured in a separate drying area using a heat source such as an oven or heat lamps. As with the above-described powder coating systems, a high solids coating system requires a substantial investment for equipment and has limited use due to the required heating step.

In a waterborne solids wet system, the coating solids are suspended in a fluid having a relatively high water to solvent ratio. Although the equipment required for this type of coating system is generally less expensive and complex due to a lower curing temperature, the required drying times are generally much longer than with solvent or dry powder based coatings. Waterbased coatings are inexpensive and have the advantages of performance comparable to undiluted oligomers, excellent gloss, good chemical resistance, versatility in roller coating and screen printing, easier to clean, and reduced ecological problems. The main advantage of water based coatings is that they can be tailor-made to suit special applications. Water, when used as a diluent, shows a dramatic viscosity reducing effect. Variable viscosity can be manipulated effectively to suit various applications.

A major disadvantage of water based coatings is the need for water removal as a separate step prior to curing. Water removal is difficult because it has high latent heat of evaporation; hence at high temperature, a high energy input is required to facilitate drying, while at ambient temperature and/or high relative humidities drying is very slow. In industrial applications, longer drying/curing times decrease productivity and become quite costly to the manufacturing process.

As stated, currently available collection systems are generally designed to discharge large quantities of air to the outside environment. Unfortunately, this results in higher energy costs since additional energy must be expended to recondition the indoor building air. In addition, the residual pollutants in the discharged air are closely regulated by local and federal agencies, oftentimes requiring the procurement of a plurality of costly permits and/or the payment of large fines. These energy and regulatory requirements oftentimes add considerable cost to the price of a finished product.

Over the last decade, the use of high solvent based coatings has drastically decreased due to the ever increasing number of regulatory restrictions on the emission levels of contaminated air into the environment. As such, the popularity of dry powder, high solids, waterborne and other alternative coatings has increased tremendously. Due to the high investment cost and limitations of the dry powder and high solids coatings, waterborne coatings stand out as the best alternative for economical use. As stated above, one of the major disadvantages of a waterborne coating system is the requisite longer drying cycle which results in substantially increased production costs. In view of the disadvantages of solvent based coatings, radiation curable, water-based coatings are becoming more popular.

SUMMARY OF THE INVENTION

The present invention discloses a radiation cure system comprising: a radiation source, an air flow housing positioned proximate the radiation source, and a damper assembly positioned proximate the housing for controlling air flow past the radiation source.

The present invention discloses a radiation cure system comprising: a plurality of radiation sources, a plurality of airflow housings positioned proximate each of the plurality of radiation sources, and a plurality of damper assemblies positioned proximate each of the plurality of airflow housings for controlling the flow of air past the radiation source.

The present invention discloses a radiation cure system comprising: at least one radiation source in the system, and at least one convective air flow channel having an input source and output source for flowing air past the radiation source.

The present invention discloses a method of cooling a radiation cure assembly comprising: blowing air through a damper assembly, and forming a convection air flow over the surface of a radiation source in the radiation cure assembly.

The present invention discloses a method of cooling a radiation source used in curing a waterbased coating comprising: providing a device having a waterbased coating thereon, curing said device using said radiation source, and controlling flow of convection air current over said radiation source by dampening the air flow.

Some of the advantages of using water based coatings in combination with the present invention are: 1) lower viscosity systems can be formulated for application techniques (spraying, roller coating, curtain coating) in which much thinner films are applied; 2) shrinkage upon curing is decreased to provide improved adhesion to nonabsorbent substrates; 3) prior to radiation curing, the coatings can be physically dry to touch; 4) zero or reduced toxicology due to reduced quantities of acrylate monomers; 5) decreased irritating odors; 6) reduced skin irritancy; and 7) zero VOC potential.

DETAILED DESCRIPTION OF THE INVENTION

Referring now specifically to the drawings, in accordance with the present invention, there is illustrated an embodiment of an automated drying and curing system, generally designated as 10, wherein like reference numbers refer to like parts throughout the drawings.

The purpose of the system of the present invention is to rapidly dry and cure a waterborne coating as applied by a spray gun 11, or other means, to a product in a manual batch process or traveling on a moving continuous conveyor track.

As illustrated in FIGS. 1–4, the product enters the housing 16 though a first housing section 16A through a wall opening 23 sufficiently sized to allow passage of the product or device (not shown) and the conveyor 18 (as stated above a manual batch process may also be used). Upon entering the "Dry Section" 19, the coating on the product is now in contact with the turbulent air flow generated by a first temperature/humidity control unit (or drying unit) 12. The first temperature/humidity control unit includes motor 30, blower 32, dehumidifer 34, multistage progressive filters 36, return dampers 38, and a Quadrant Diffuser System 21A which controls the air pressure into the filters (as disclosed in U.S. Pat. No. 5,554,416, issued to Scheufler et al. on Sep. 10, 1996 and assigned to Optimum Air Corporation). An air stream or flow 13 exits the first temperature/humidity control unit and flows towards the product and conveyor 18. Optimal positioning of the product on the conveyor 18 within the Dry Section 19, subjects it to high velocity air from the return dampers 38, lower velocity air moving to the filters area, or a combination of both. The air circulating in the Dry Section 19, being of a lower moisture content than the wet coating on the product, absorbs the moisture from the coating. The air is then collected through the multistage progressive filters 36 by means of the negative pressure developed by the blower 32.

While passing through the multistage filter "bank", successively finer particulate in the air is trapped in the filters 36. Volatile organic compounds, which may exist in the coating and out-gas during the drying process, are adsorbed by carbon or media suitable for the application in the filters 36.

The air flow 13, now cleaned or purified of pollutants to acceptable levels, passes through the blower 32 to the positive pressure side of the blower, and is pushed through the dehumidifier 34 area. Upon contact of the moisture laden air with the colder evaporator coil (not shown) of the dehumidifier 34, the moisture in the air condenses on the coil, lowering the relative humidity, and temperature of the air. The extant "chilled" air is carried through a condenser (not shown), or reheat coil, which raises the air temperature to the approximate temperature at which it entered the dehumidifier 34. The air flow 13 then passes through the return dampers 38 and returns to the housing for another cycle. With each successive pass of the air through the first temperature/humidity control unit 12, additional moisture is transferred from the coating to the evaporator coil, which ultimately dries the coating.

When all the water is removed from the coating, the product is then carried into the "Cure Section" 20. The curing section 20 is made up of a second housing section 16B and a third housing section 16C. The product and conveyor 18 pass through a product conveyor wall opening 24 between the Dry Section 19 and the Cure Section 20 into an area bounded by the wall of the second housing section 16B and a barrier designated "Wall A." This area is fed with air flow 15 from return dampers 39 of a second temperature/humidity control unit 14. The structure of the second temperature/humidity control unit 14 is identical to that of the first temperature/humidity control unit 12. The second temperature/humidity control unit 14 contains a motor 31, blower 33, dehumidifier 35, multistage progressive filters 37, and a Quadrant Diffuser System 21B (shown in FIG. 3). Mounted on the second temperature/humidity control unit 14 next to the motor 31 is a control panel 29 which controls the operation of the system 10. Wall A has openings in the surface of sufficient size to pass the product and conveyor 18, and additional openings which are designed to supply air flow 15 to the curing lamp assemblies 22. Three curing lamp assemblies 22 are shown in the drawings, but the number could range from just one to as many as twenty (or to as many as are needed depending on the application).

Figure 5:
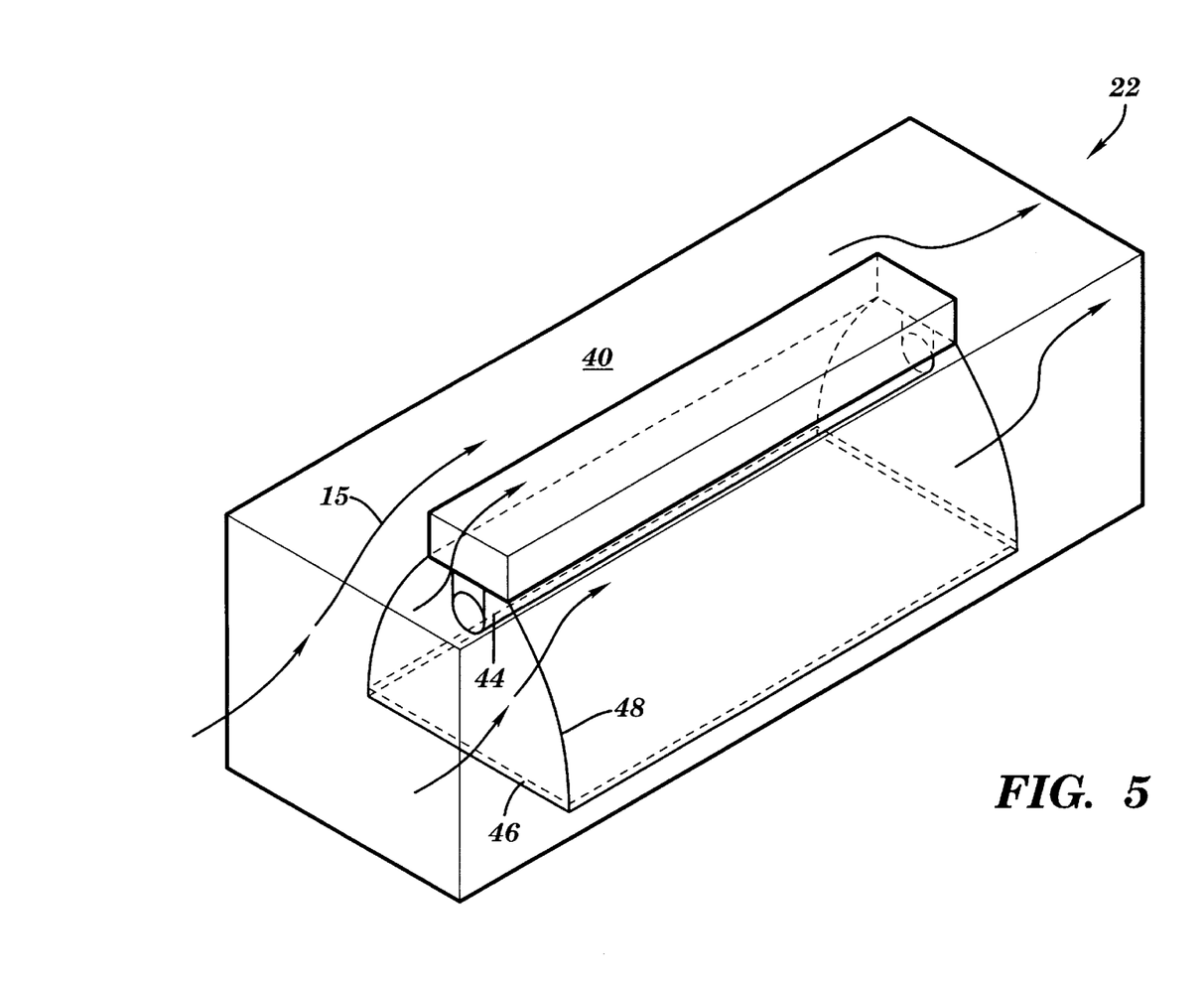
FIG. 5 shows a perspective view of the curing assembly.
Figure 6:
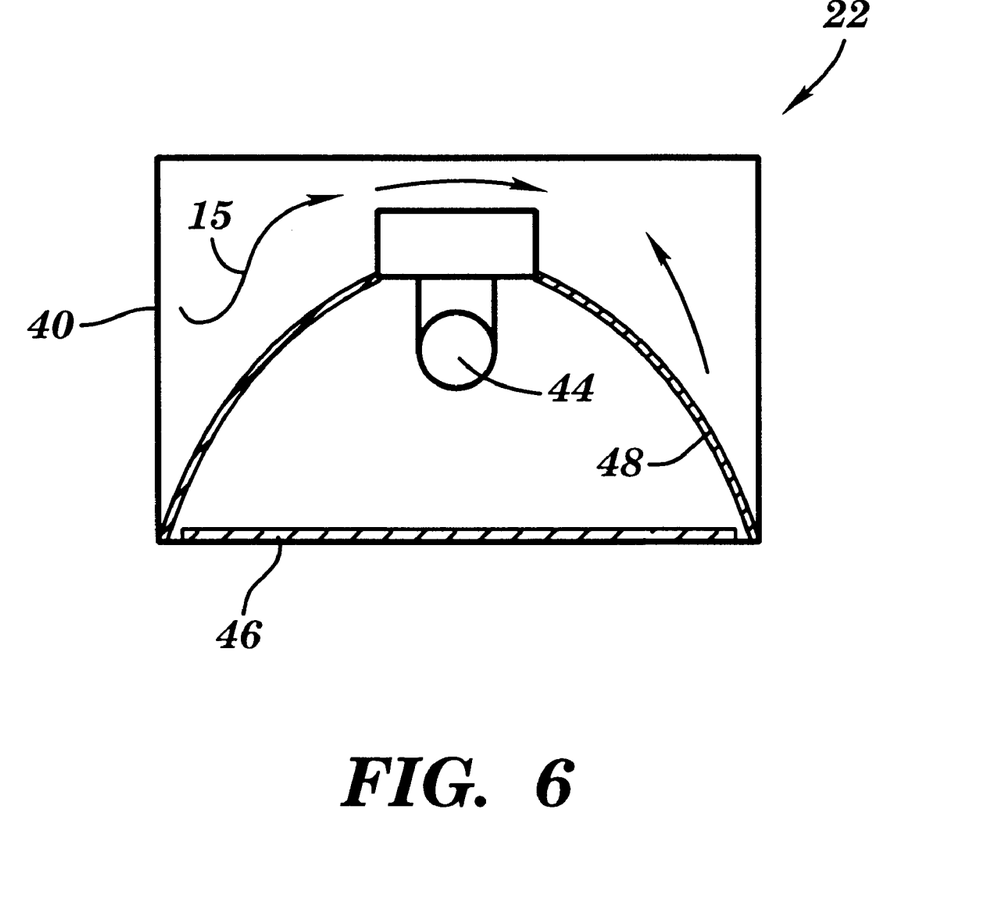
FIG. 6 shows a side view of the curing lamp assembly.

A curing lamp assembly 22, sometimes called an irradiator, is shown in detail in FIGS. 5 and 6. The curing lamp or radiation source assembly 22 normally consists of a sheet metal housing 40, a high intensity lamp 44, and a reflector 48 for focusing the radiation. An area immediately surrounding the reflector 48 and lamp 44 is supplied to provide a chamber for the passage of an air flow 15 in a convective air flow channel to carry the heat dissipated from the lamp 44 out of the assembly. The high operating temperatures of the lamp 44, if not evacuated from the housing, may degrade the lamp 44 and/or distort the reflector 48. Therefore a supply of a cooling medium (i.e., air flow 15) must be supplied to the housing 40. A separate lens assembly 46 is sometimes provided between the lamp and the product to be cured to isolate the lamp 44 from the surrounding air. Moving air around some types of lamps will cool the lamp surface and cause the internal gases to condense on the inside surface, degrading the lamp 44.

Figure 1:
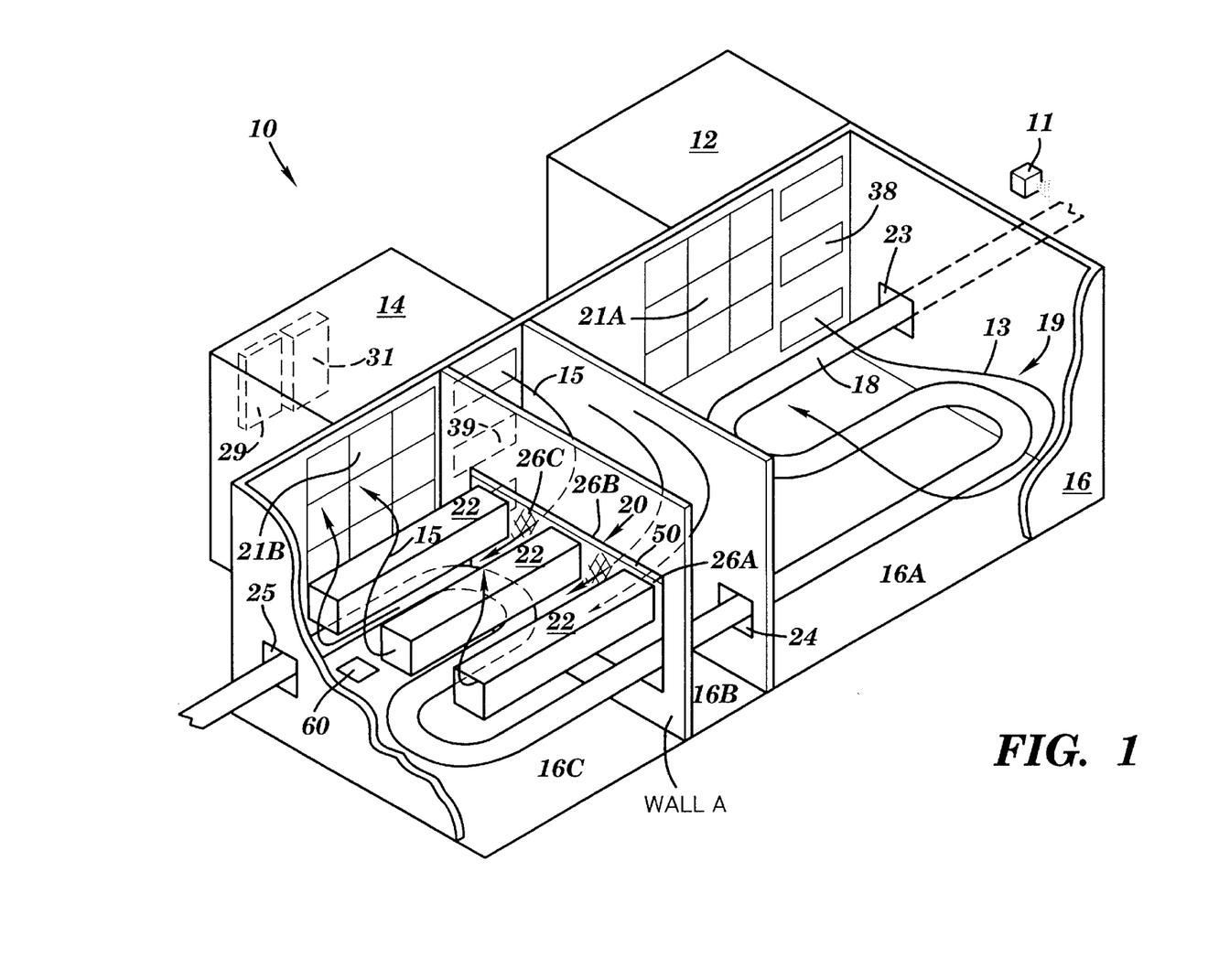
FIG. 1 shows a side view of the present invention.

The housing inlet duct 26B as shown in FIG. 1 is exposed through an additional opening in "Wall A" which is covered by a filtering screen 26C. The screen 26C filters the air flowing through the lamp assembly 22, the bypass enclosure air, and to some extent, the air flowing through the product conveyor wall opening 26A. The positive pressure of the second temperature/humidity control unit 14 forces the air through the second housing section 16B and into the third housing section 16C and carries the heat generated by the lamp assembly 22 away from the lamp. The heat discharged by the lamp assembly mixes with the enclosure air and is carried to the mulistage progressive filters 37 as described in the previous section. The air is passed through the dehumidification unit 35 as previously described and returned to the lamp assemblies for another cycle. Clean, low relative humidity air extends the service life of both the reflector material and the lamp when used in the lamp assembly cooling process. Dirt and moisture degrade both components, and high heat accelerates the degradation.

The "Wall A" openings 26A and 26B can be metered to control the volume of air by the use of a panel device 50. The panel device 50 is lowered or raised depending on the amount of airflow required for the application.

The Quadrant Diffuser System, the openings for the lamp assembly ducts, the bypass enclosure air, and, to some extent, the product/conveyor openings can all be varied to meet the requirements of the application.

As the product passes the lamp assembly 22, it is subjected to a focused radiation source for a predetermined wave length, intensity, and duration. The photo-initiators in the coating initiate a chain reaction of polymer chain cross-linking, continuing until all available bonds are linked. At this point the coating is cured to its full depth across the entire coating surface. Cure time is dependent upon the coating resins and additives used, but is essentially accomplished in a matter of minutes, if not seconds.

Located in the third housing section 16C is a sensor 60 which is tied by a feedback loop to a computer controller mounted on the control panel 29. The sensor monitors the humidity level, temperature, and other environmental conditions inside the automated drying and curing system 10 and allows for automatic or manual adjustment of the operating conditions. The sensor could also monitor the dryness, thickness, etc. of the paint on the product through an optical device (not shown) to determine the quality of the coating and adjust the operating conditions accordingly. One sensor 60 could be used or multiple sensors spread thoughout the system 10 could be used.

Upon completion of the curing process, the product is carried by the conveyor 18 through the wall exit 25 to the next process, such as unloading and packaging.

FIGS. 7–11 form an alternative embodiment of the present invention.

Figure 7:
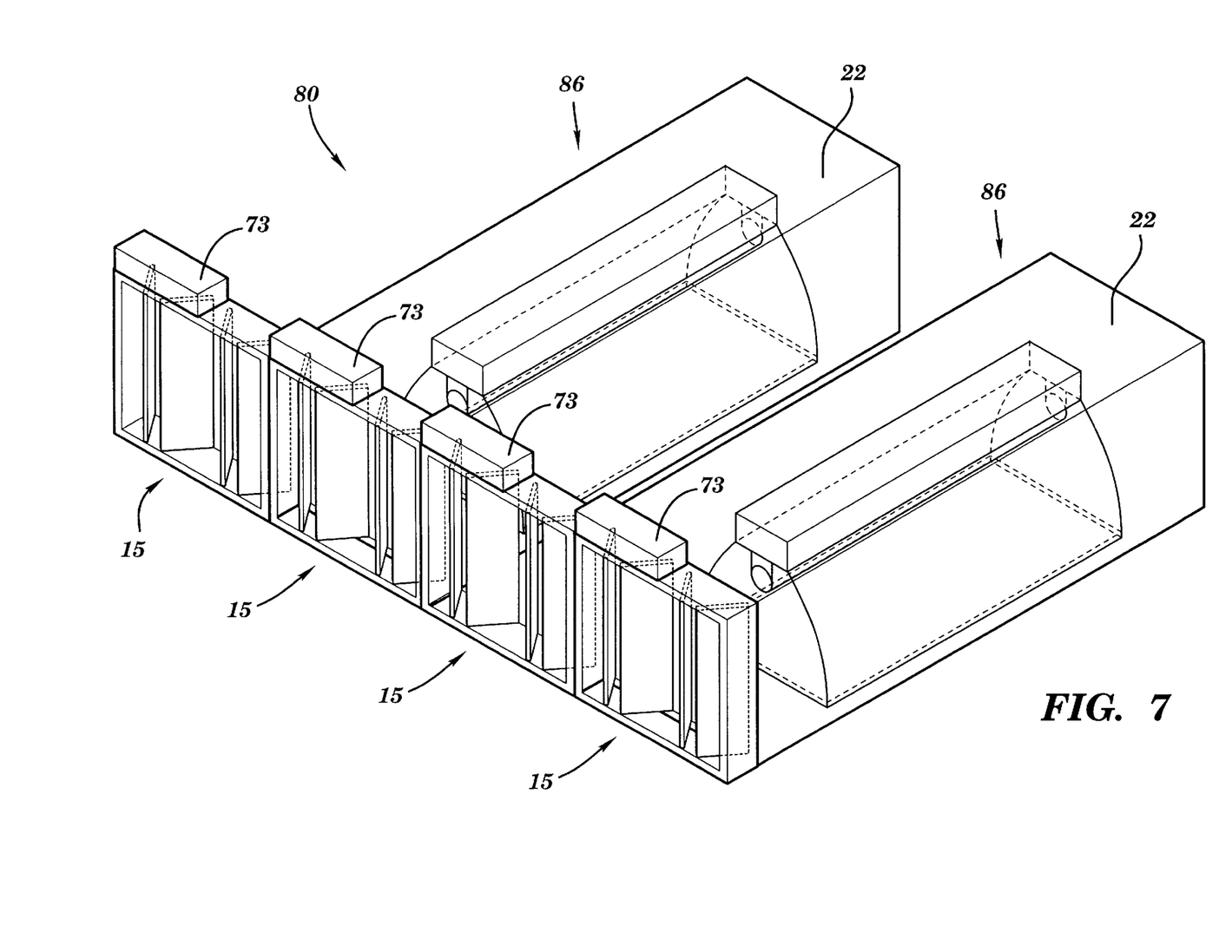
FIG. 7 shows a perspective view of a second embodiment of the multiple lamp system or radiation cure system.

FIG. 7 shows a perspective view of a multiple lamp system or radiation cure system 80. The radiation source assemblies 22 combine with the damper assemblies 73 to form the radiation cure system 80. (The damper assemblies 73 either replace or are used in addition to the filtering screens 26C shown in FIG. 1). The damper assemblies 73 are located side-by-side with a radiation source assembly 22 attached to every other damper assembly 73. The areas between the radiation source assemblies 22 form bypass airflow channels 86 paralleling the convective airflow channels formed through the radiation source assemblies 22. The input source to each of the bypass airflow and convective airflow channels are the damper assemblies 73. The output source of each of the convective airflow channels is the radiation cure assembly exit 85. The number of radiation source assemblies 22 vary depending on the application but may range anywhere from 1 to 20.

Figure 8:
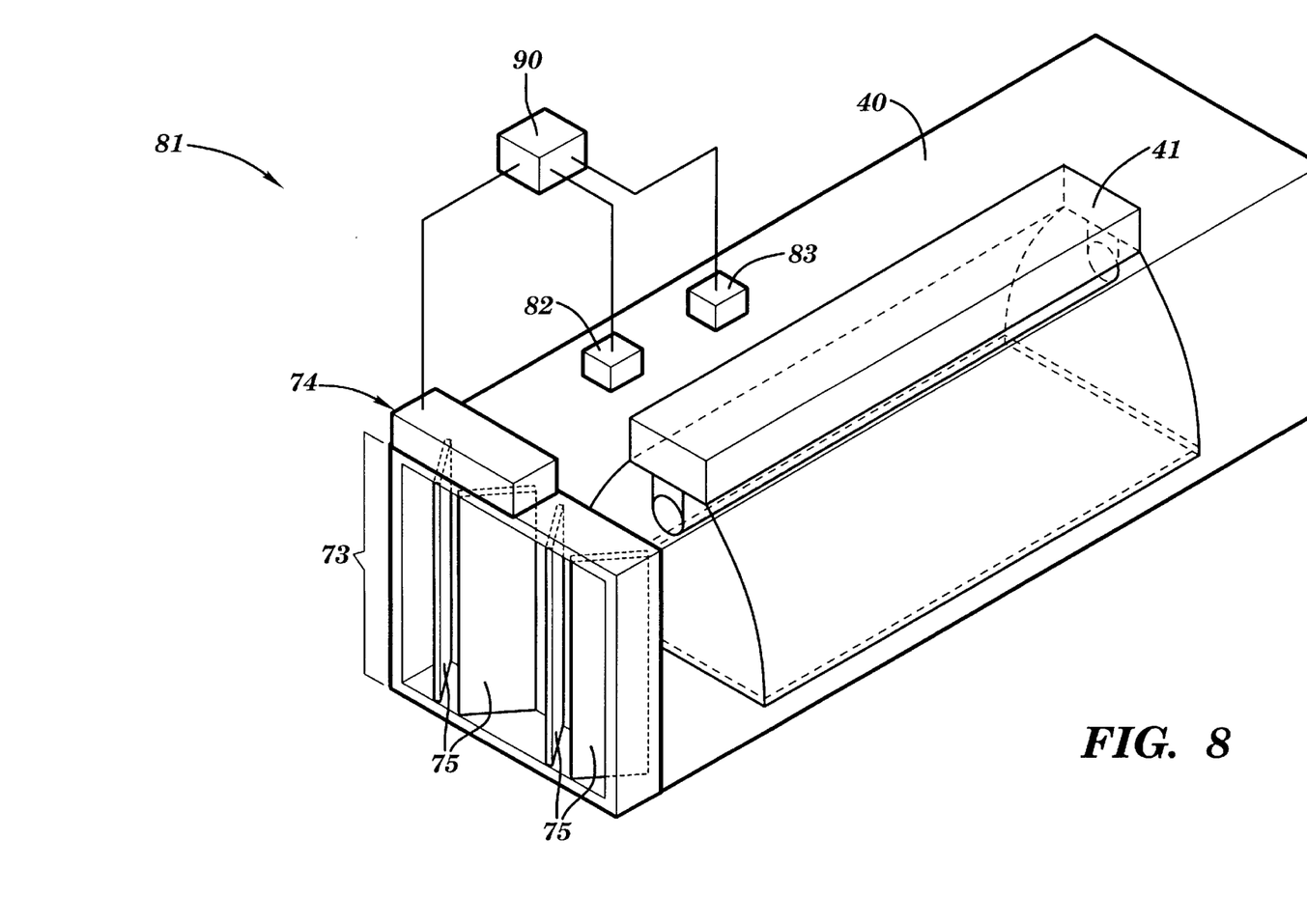
FIG. 8 shows a perspective view of a lamp assembly or radiation cure assembly of the second embodiment.

FIG. 8 shows a perspective view of the lamp assembly or radiation source assembly 22 attached to a damper assembly 73. The damper assembly 73 is made up of a damper motor 74 and a pair of damper doors 75 for a total of 4 doors. The settings of the damper doors 75 will effect the amount of flow of the air over the radiation source assemblies 22 and in the bypass airflow channels 86 (shown in FIG. 7). The settings of the doors may be adjusted by either the damper motor 74 or by manual adjustment by the operator. The damper doors 75 may be coupled through a feedback loop to a plurality of sensors 82 which measure the temperature of any or all of the radiation source assembly 22, the radiation source 44, and the lens assembly 46. The damper doors 75 may be adjusted based on the feedback from any or all of the sensors 82. The damper doors 75 may also be coupled to a timer 83 which measures the length of time the radiation source has been turned on and adjusts the damper doors 75 accordingly. The damper doors 75 may also be tied by a feedback loop to the sensor 60 which measures the environment of the third housing section 16C. By adjusting the damper doors 75 the amount of air flow 15 is adjusted and therefore the rate of cooling of the radiation source assembly 22 may be adjusted.

Figure 9:
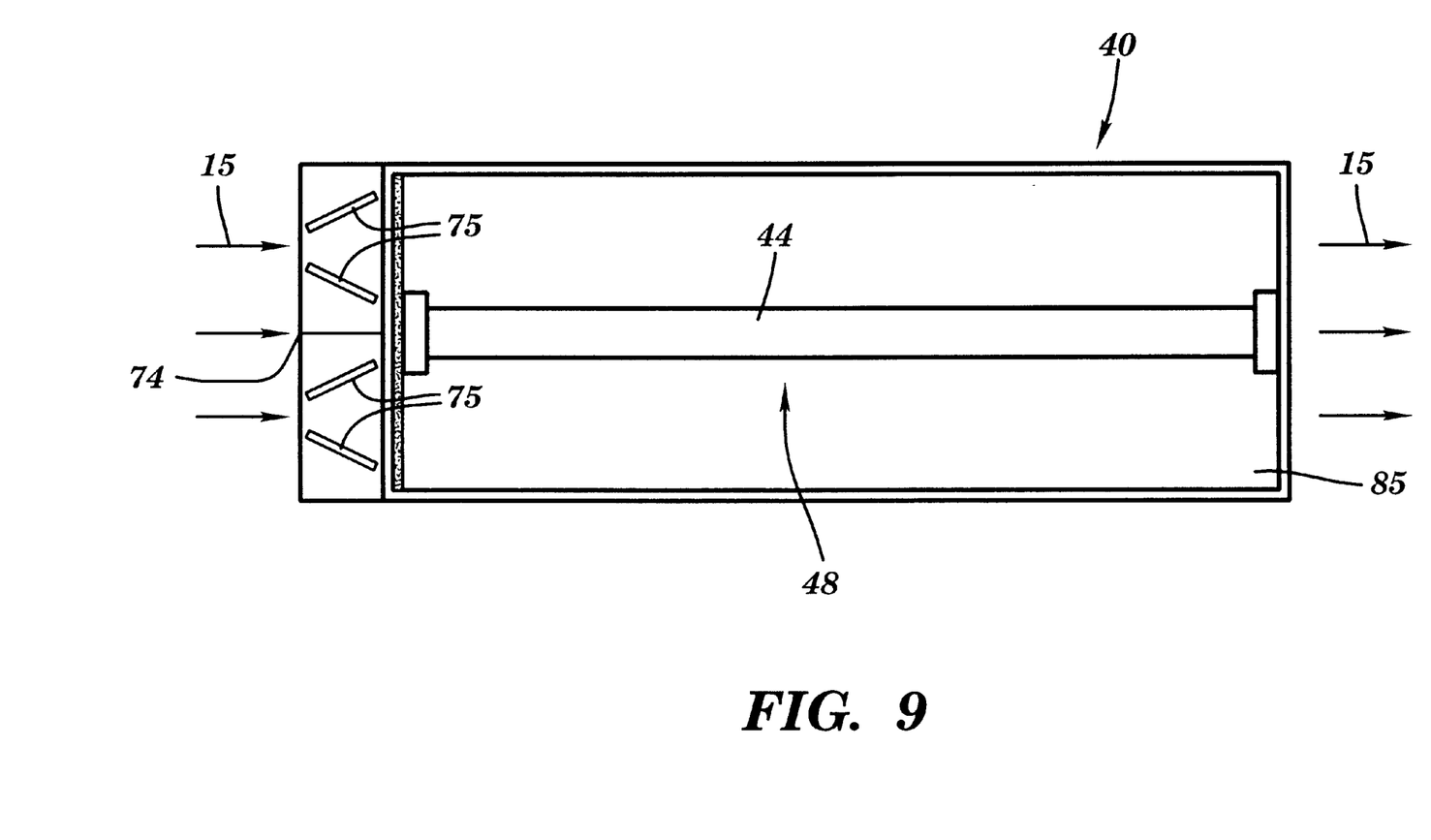
FIG. 9 shows a top view of a lamp assembly or radiation cure assembly of the second embodiment.

FIG. 9 shows a top view of the lamp or radiation source assembly 22 attached to a damper assembly 73. Reference numeral 85 indicates a radiation cure assembly exit.

Figure 10:
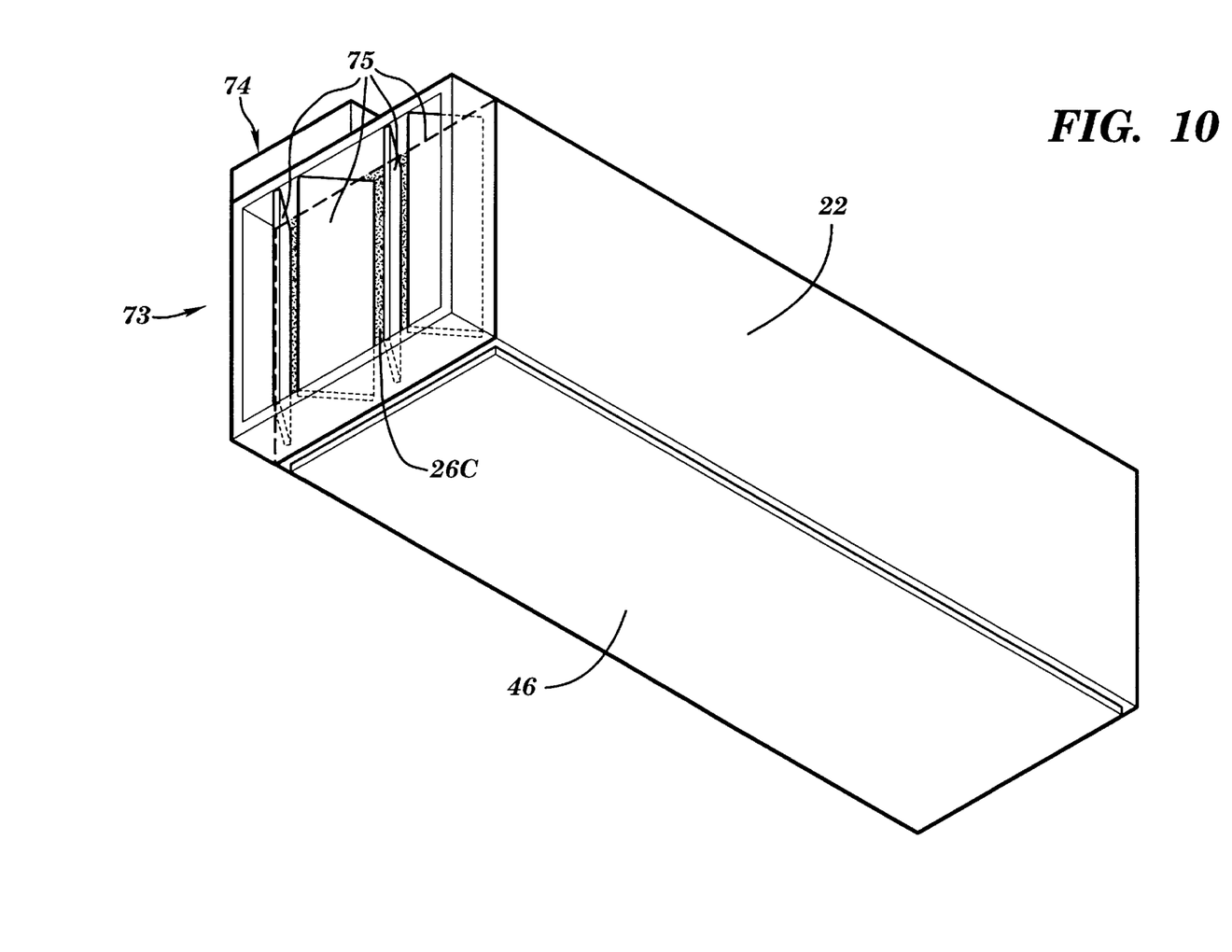
FIG. 10 shows a bottom view of a lamp assembly or radiation cure assembly of the second embodiment.

FIG. 10 shows a bottom view of the lamp or radiation source assembly 22 attached to the damper assembly 73 with the lens assembly 46 in position.

Figure 11:
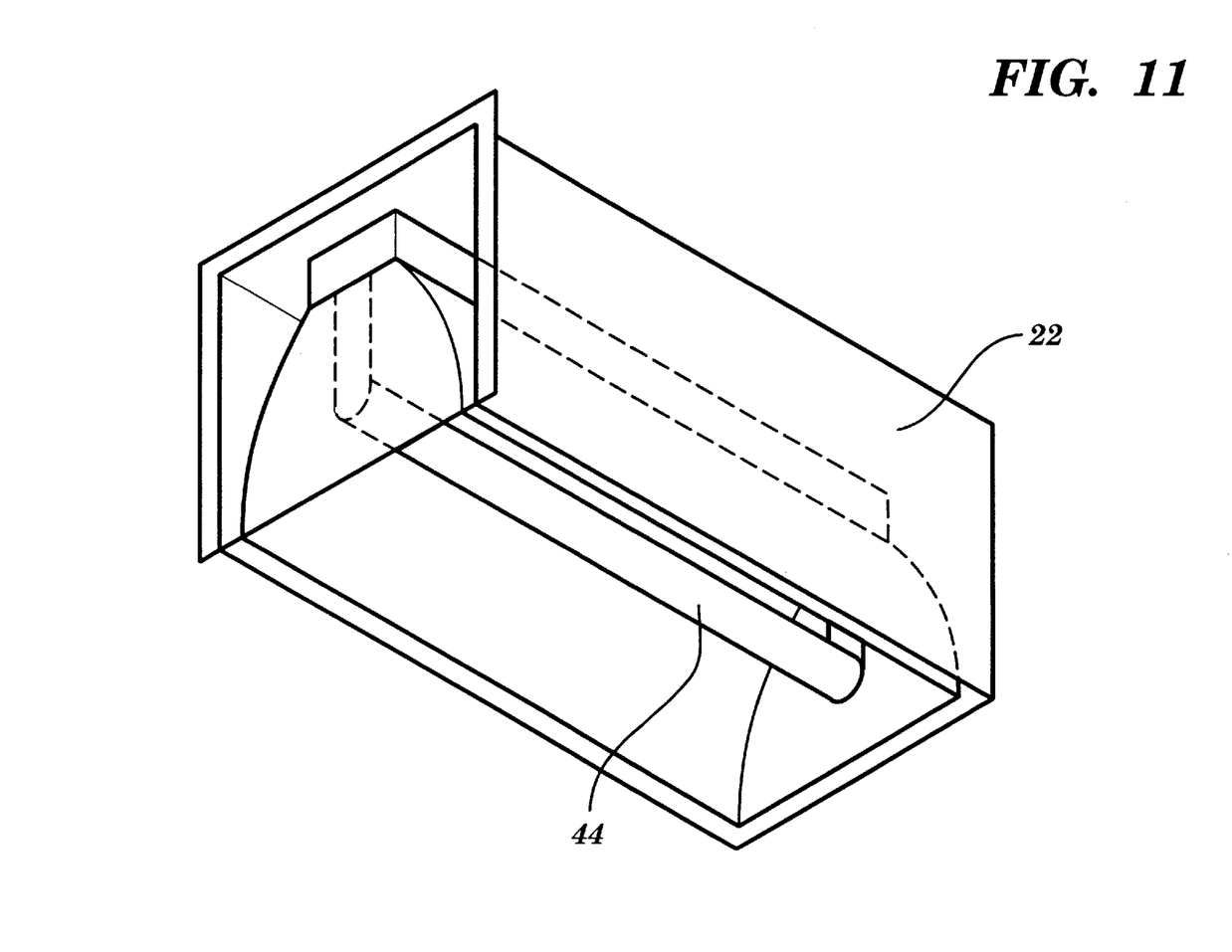
FIG. 11 shows a bottom view of a lamp assembly or radiation cure assembly of the second embodiment.

FIG. 11 shows a bottom view of the lamp or radiation source assembly 22 without the damper assembly and with the radiation source 44 exposed. As stated above, the curing may be performed with either the lens assembly 46 in position or out of position.

What is claimed is:

1. A radiation curing system comprising:

an radiation source;

an airflow housing positioned proximate the radiation source; and means, positioned proximate the airflow housing, for treating a waterborne coating, wherein the means for treating includes a filtration device.

2. The system of claim 1, wherein the means for treating includes an air flow producing device, a temperature control device, and a humidity control device.

3. The system of claim 1, further comprising a damper assembly positioned proximate the airflow housing.

4. The system of claim 3, wherein the damper assembly includes a first and a second pair of damper doors.

5. The system of claim 3 further comprising a filtering screen positioned between the damper assembly and the radiation source.

6. The system of claim, of claim 4, wherein the damper assembly further includes a damper motor for adjusting the first and the second pair of damper doors.

7. The system of claim 4, wherein the second pair of damper doors are adjustable.

8. The system of claim 4 further comprising:

a sensor that measures the heat of the radiation source; and a feedback loop coupled to the sensor that controls the opening and closing of the first and the second pair of damper doors.

9. The system of claim 4 further comprising:

a sensor that measures the length of time that the radiation source has been turned on; and a feedback loop coupled to the sensor that controls the opening and closing of the first and the second pair of damper doors.

10. The system of claim 3, wherein a convection airflow flows through the damper assembly and the airflow housing.

* * * * *

UNITED STATES PATENT AND TRADEMARK OFFICE
CERTIFICATE OF CORRECTION

PATENT NO. : 5,921,002
DATED : 7/13/99
INVENTOR(S) : Scheufler et al.

Figure 2:
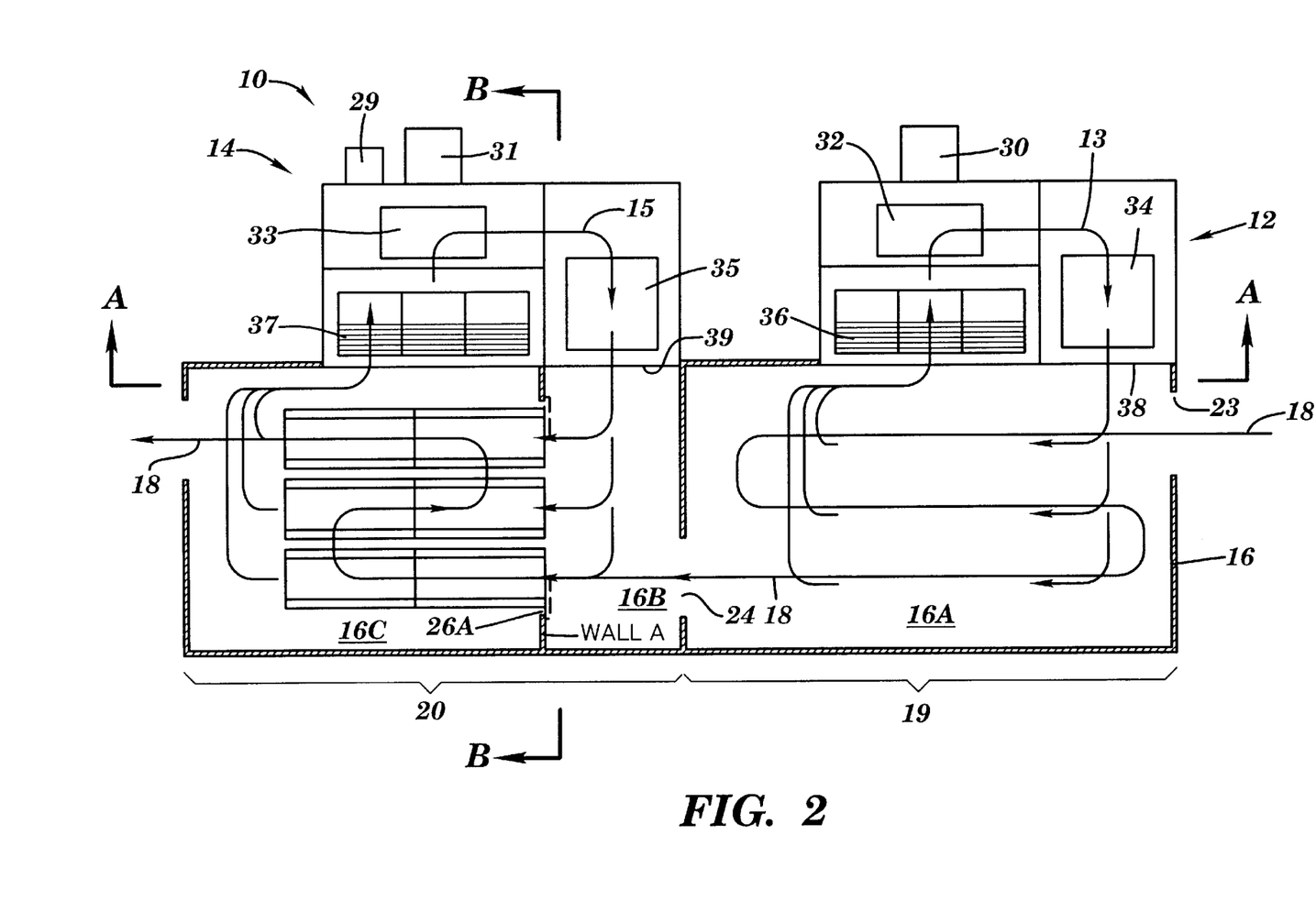
FIG. 2 shows a top view of the present invention.
Figure 3:
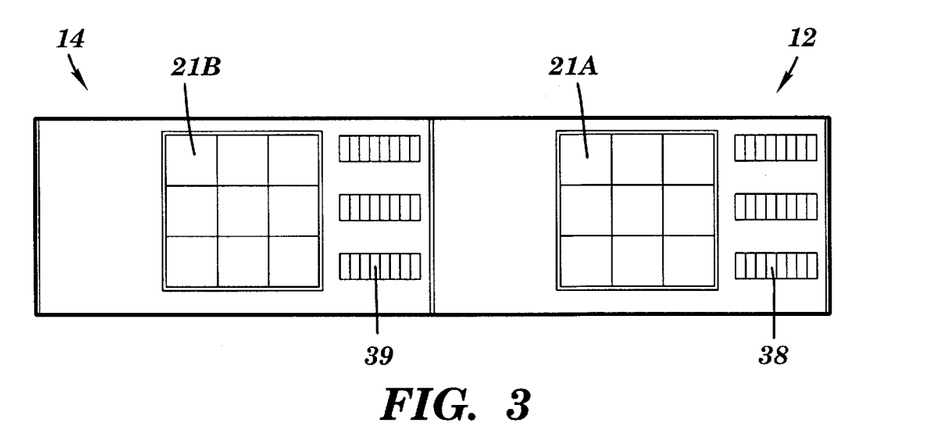
FIG. 3 shows a view along line 3—3 in FIG. 2.
Figure 4:
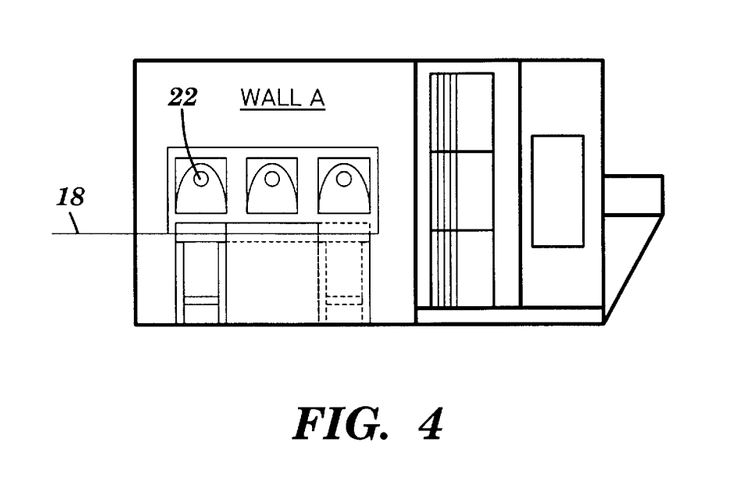
FIG. 4 shows a view along line 4—4 in FIG. 2.

It is certified that error appears in the above-identified patent and that said Letters Patent is hereby corrected as shown below:

In the drawings - FIG. 2 , Delete the letters "A-A and B-B" and insert --3-3 and 4-4--.

Signed and Sealed this

Fifteenth Day of August, 2000

Attest:

Q. TODD DICKINSON

Attesting Officer     *Director of Patents and Trademarks*